(12) United States Patent
Krink et al.

(10) Patent No.: US 12,526,909 B2
(45) Date of Patent: Jan. 13, 2026

(54) WEAR PART FOR AN ARC TORCH AND PLASMA TORCH, ARC TORCH AND PLASMA TORCH COMPRISING SAME, METHOD FOR PLASMA CUTTING AND METHOD FOR PRODUCING AN ELECTRODE FOR AN ARC TORCH AND PLASMA TORCH

(71) Applicant: Kjellberg-Stiftung, Finsterwalde (DE)

(72) Inventors: Volker Krink, Finsterwalde (DE); Frank Laurisch, Finsterwalde (DE); Ralf-Peter Reinke, Finsterwalde (DE); Katrin Jehnert, Finsterwalde (DE)

(73) Assignee: Kjellberg-Stiftung, Finsterwalde (DE)

( * ) Notice: Subject to any disclaimer, the term of this patent is extended or adjusted under 35 U.S.C. 154(b) by 925 days.

(21) Appl. No.: 17/642,619

(22) PCT Filed: Apr. 15, 2020

(86) PCT No.: PCT/DE2020/100301
§ 371 (c)(1),
(2) Date: Mar. 11, 2022

(87) PCT Pub. No.: WO2021/047708
PCT Pub. Date: Mar. 18, 2021

(65) Prior Publication Data
US 2022/0346216 A1    Oct. 27, 2022

(30) Foreign Application Priority Data
Sep. 12, 2019   (DE) .................... 10 2019 124 521.4

(51) Int. Cl.
*H05H 1/34*    (2006.01)
*B23K 10/00*   (2006.01)

(52) U.S. Cl.
CPC ............. *H05H 1/34* (2013.01); *B23K 10/006* (2013.01)

(58) Field of Classification Search
CPC ................................ H05H 1/34; B23K 10/006
USPC ..................................................... 219/121.44
See application file for complete search history.

(56) References Cited

U.S. PATENT DOCUMENTS

| | | |
|---|---|---|
| 3,198,932 A | 8/1965 | Weatherly |
| 3,475,123 A | 10/1969 | Wilson et al. |
| 3,930,139 A * | 12/1975 | Bykhovsky ........ B23K 35/0205 219/146.21 |
| 4,769,524 A | 9/1988 | Hardwick |
| 5,023,425 A * | 6/1991 | Severance, Jr. ......... H05H 1/34 219/121.48 |
| 5,097,111 A | 3/1992 | Severance, Jr. |
| 5,166,494 A | 11/1992 | Luo et al. |

(Continued)

FOREIGN PATENT DOCUMENTS

| | | |
|---|---|---|
| CN | 102026467 A | 4/2011 |
| DE | 102018100917 A1 | 3/2019 |

(Continued)

*Primary Examiner* — Jimmy Chou
(74) *Attorney, Agent, or Firm* — Jonathan M. D'Silva; MMI Intellectual Property

(57) ABSTRACT

The invention relates to a wear part for an arc torch, plasma torch or plasma cutting torch, characterised in that the wear part or at least one part or a region of the wear part consists of an alloy formed from silver and zirconium, silver and hafnium, or silver and zirconium and hafnium.

21 Claims, 17 Drawing Sheets

(56) References Cited

U.S. PATENT DOCUMENTS

| | | | | |
|---|---|---|---|---|
| 5,676,864 A * | 10/1997 | Walters | | H05H 1/34 219/121.52 |
| 5,767,478 A * | 6/1998 | Walters | | H05H 1/34 219/121.48 |
| 5,857,888 A * | 1/1999 | Tada | | H05H 1/34 445/35 |
| 5,908,567 A | 6/1999 | Sakuragi et al. | | |
| 6,054,669 A * | 4/2000 | Warren, Jr. | | B23K 10/003 219/121.54 |
| 6,191,381 B1 * | 2/2001 | Kabir | | H05H 1/34 219/121.48 |
| 6,268,583 B1 * | 7/2001 | Yamaguchi | | H05H 1/34 219/121.52 |
| 6,423,922 B1 * | 7/2002 | Nemchinsky | | H05H 1/34 219/121.48 |
| 6,433,300 B1 * | 8/2002 | McBennett | | B23K 35/402 219/121.52 |
| 6,483,070 B1 * | 11/2002 | Diehl | | H05H 1/34 219/121.48 |
| 6,563,075 B1 | 5/2003 | Severance, Jr. et al. | | |
| 6,583,378 B1 | 6/2003 | Yamaguchi et al. | | |
| 8,541,712 B2 * | 9/2013 | Mather | | H05H 1/34 219/121.52 |
| 9,516,738 B2 | 12/2016 | Wittmann et al. | | |
| 2002/0125224 A1 * | 9/2002 | Cook | | B23K 20/129 219/121.36 |
| 2004/0195220 A1 * | 10/2004 | Delzenne | | H05H 1/34 219/121.52 |
| 2005/0161443 A1 * | 7/2005 | Krink | | H05H 1/34 219/121.52 |
| 2011/0259855 A1 | 10/2011 | Yang | | |
| 2012/0132626 A1 * | 5/2012 | Laurisch | | H05H 1/34 219/121.36 |
| 2012/0199562 A1 * | 8/2012 | Friedel | | B23K 10/006 219/121.44 |
| 2013/0043224 A1 * | 2/2013 | Leiteritz | | H05H 1/34 219/121.52 |
| 2013/0240499 A1 * | 9/2013 | Hollberg | | H05H 1/34 219/383 |
| 2013/0313231 A1 * | 11/2013 | Laurisch | | B23K 10/00 219/121.52 |
| 2014/0014630 A1 * | 1/2014 | Namburu | | H05H 1/34 219/121.52 |
| 2014/0021172 A1 * | 1/2014 | Sanders | | H05H 1/34 29/428 |
| 2014/0144891 A1 * | 5/2014 | Laurisch | | H05H 1/34 219/121.44 |
| 2016/0129515 A1 * | 5/2016 | Phillip | | B23K 37/0408 219/121.44 |
| 2017/0332469 A1 * | 11/2017 | Friedrich-Wilhelm | | H05H 1/34 |
| 2018/0243864 A1 * | 8/2018 | Namburu | | B23K 35/0216 |
| 2018/0368246 A1 * | 12/2018 | Raymond | | B23K 10/006 |
| 2019/0009356 A1 * | 1/2019 | Severance, Jr. | | H05H 1/341 |

FOREIGN PATENT DOCUMENTS

| | | | | |
|---|---|---|---|---|
| JP | 2001150143 A | * | 6/2001 | ............ H05H 1/34 |
| KR | 20020034537 A | | 5/2002 | |
| KR | 20070038801 A | | 4/2007 | |
| KR | 101942019 B1 | * | 1/2019 | ............ H05H 1/34 |
| RU | 204320 U1 | * | 5/2021 | ............ H05H 1/34 |

\* cited by examiner

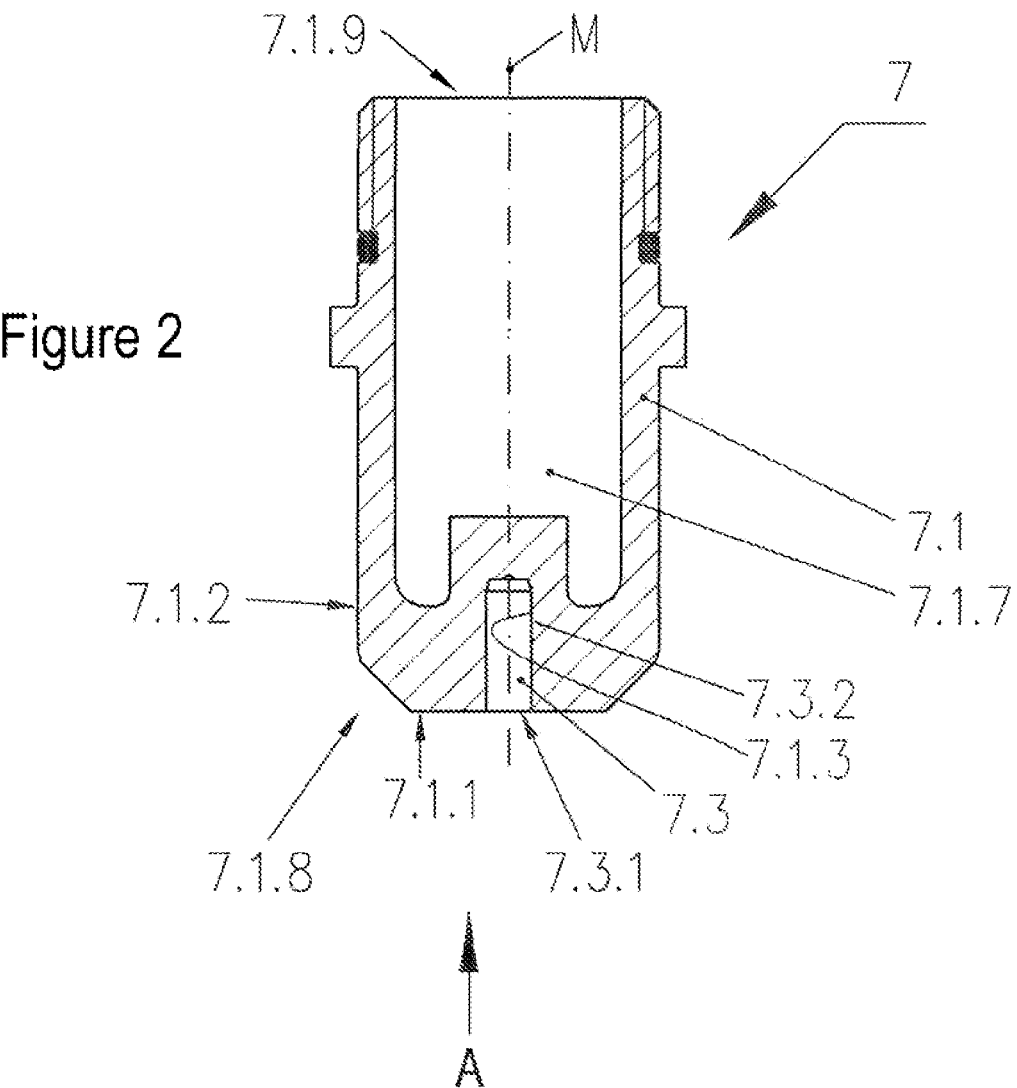
Figure 2
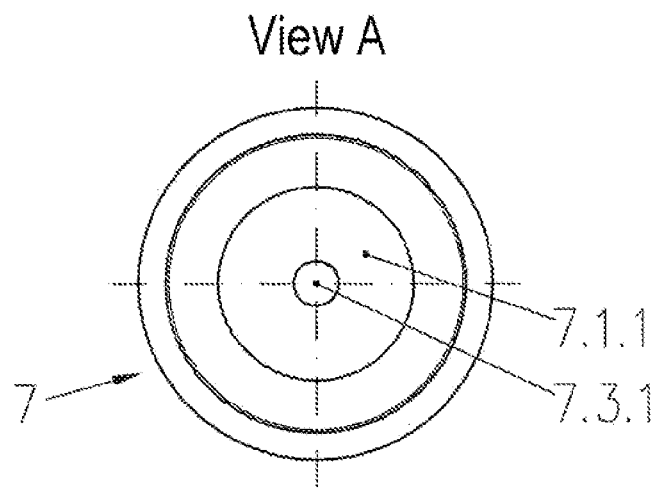
Figure 2.1

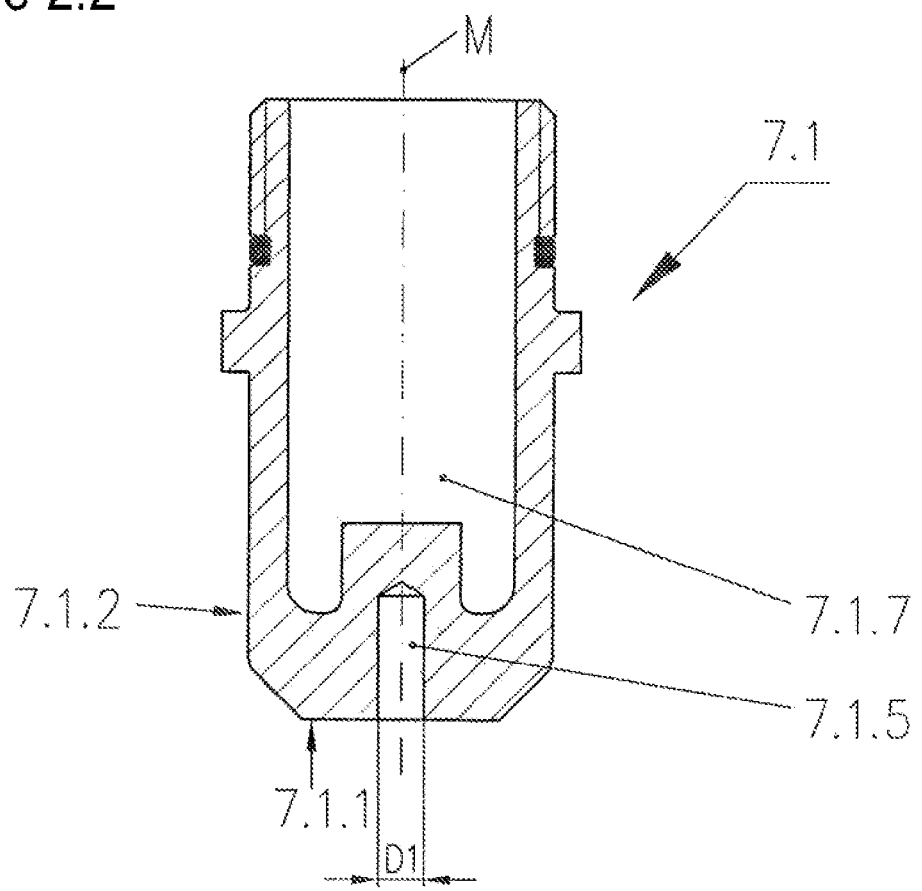
Figure 2.2

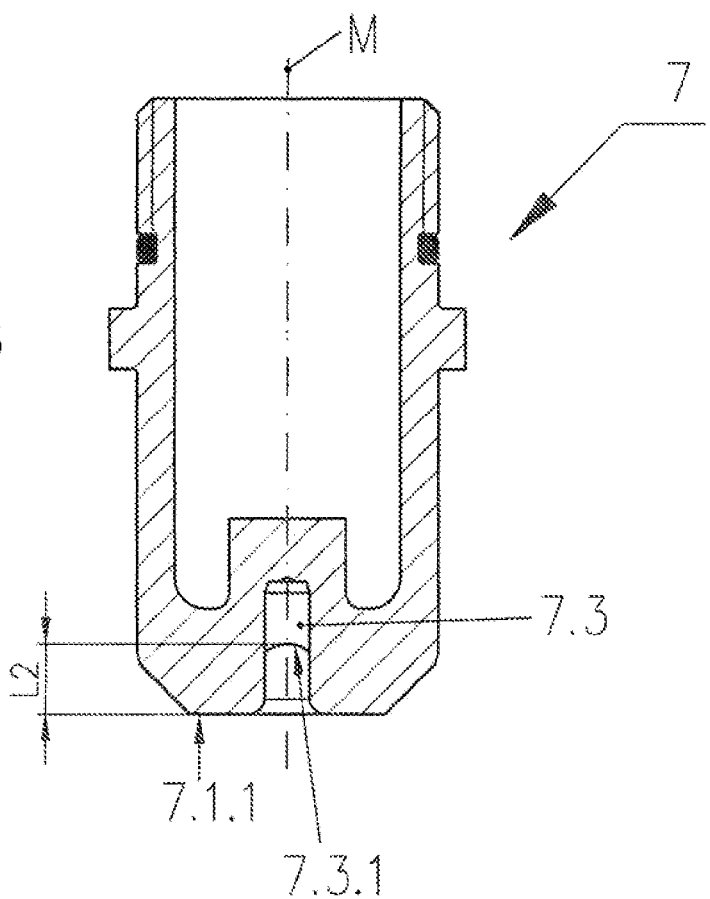
Figure 2.3
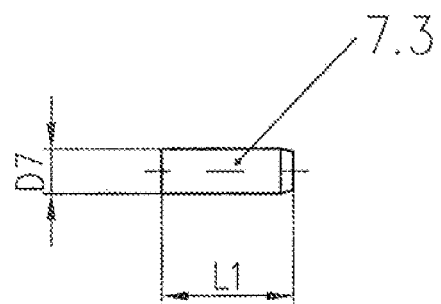
Figure 2.4

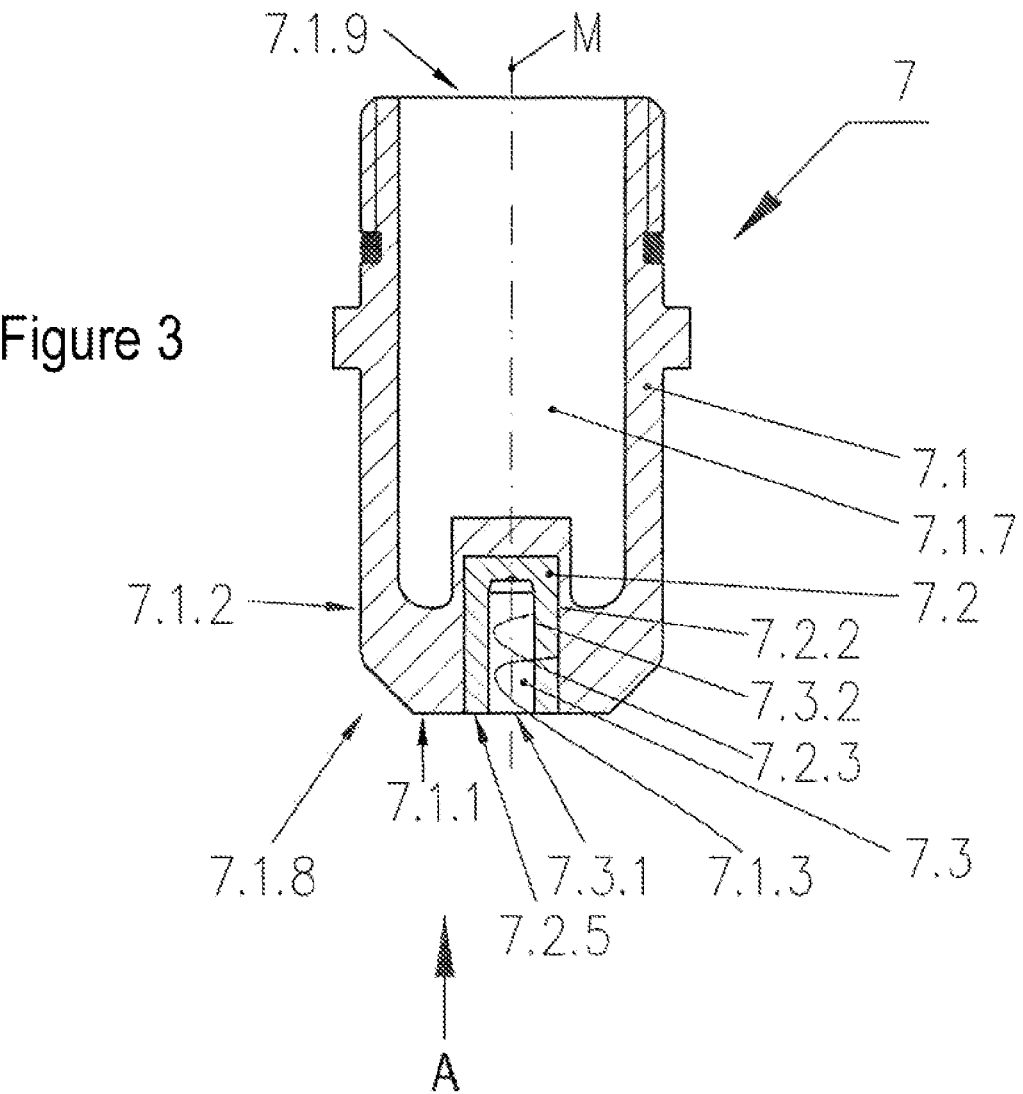
Figure 3
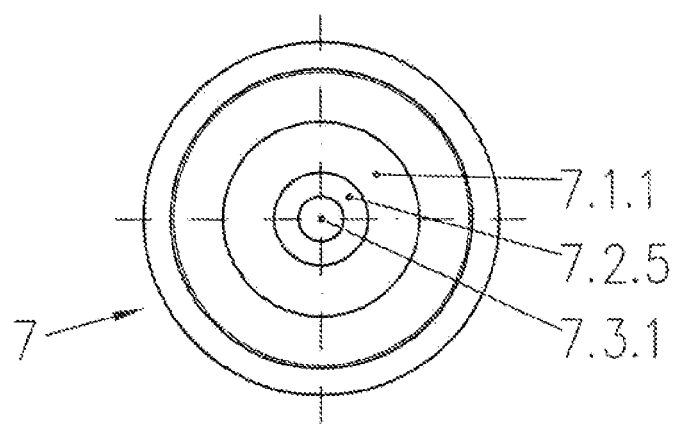
Figure 3.1
View A

Figure 3.2
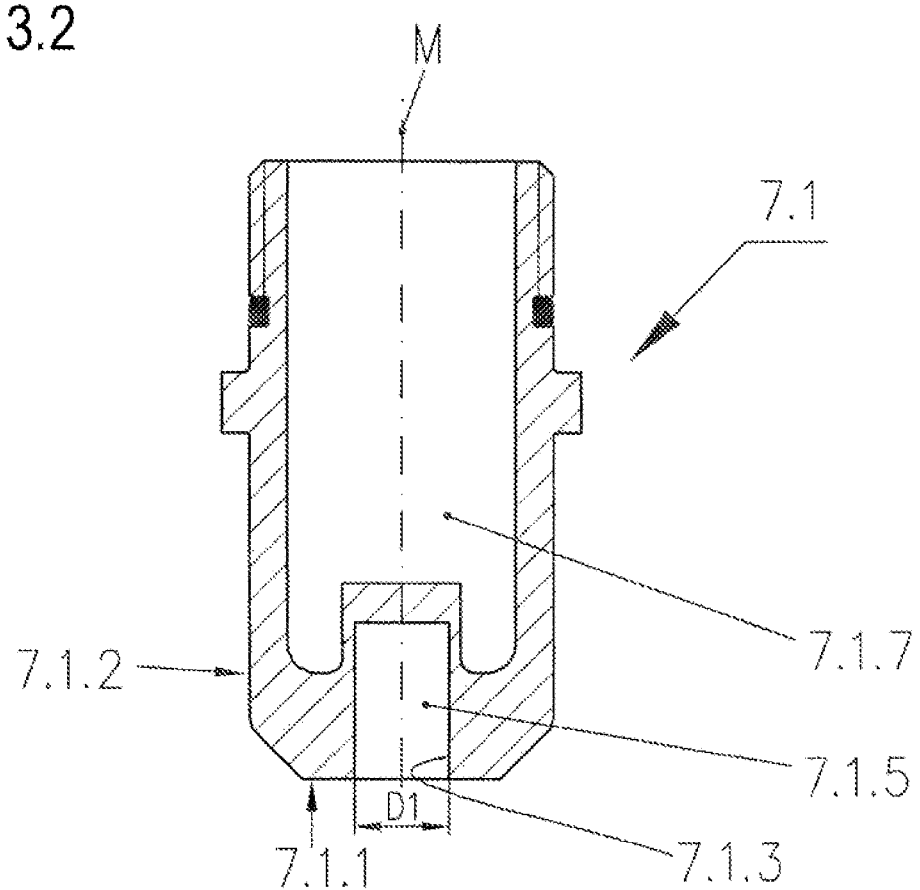

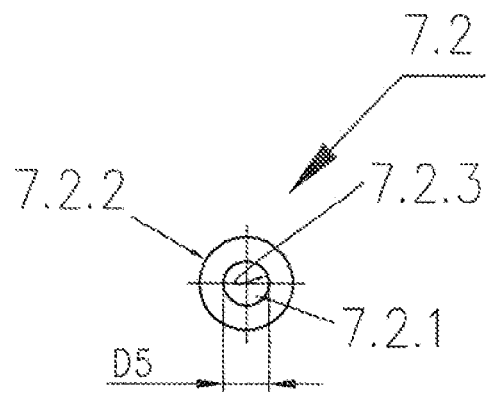
Figure 3.3
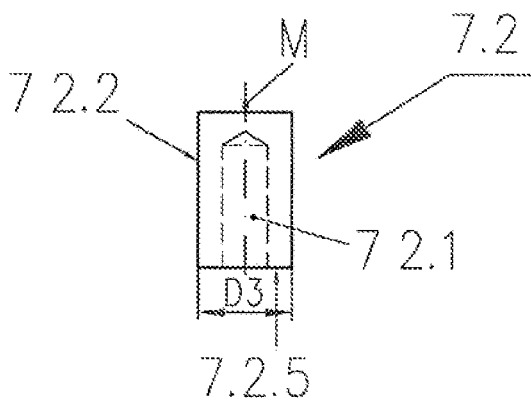
Figure 3.4

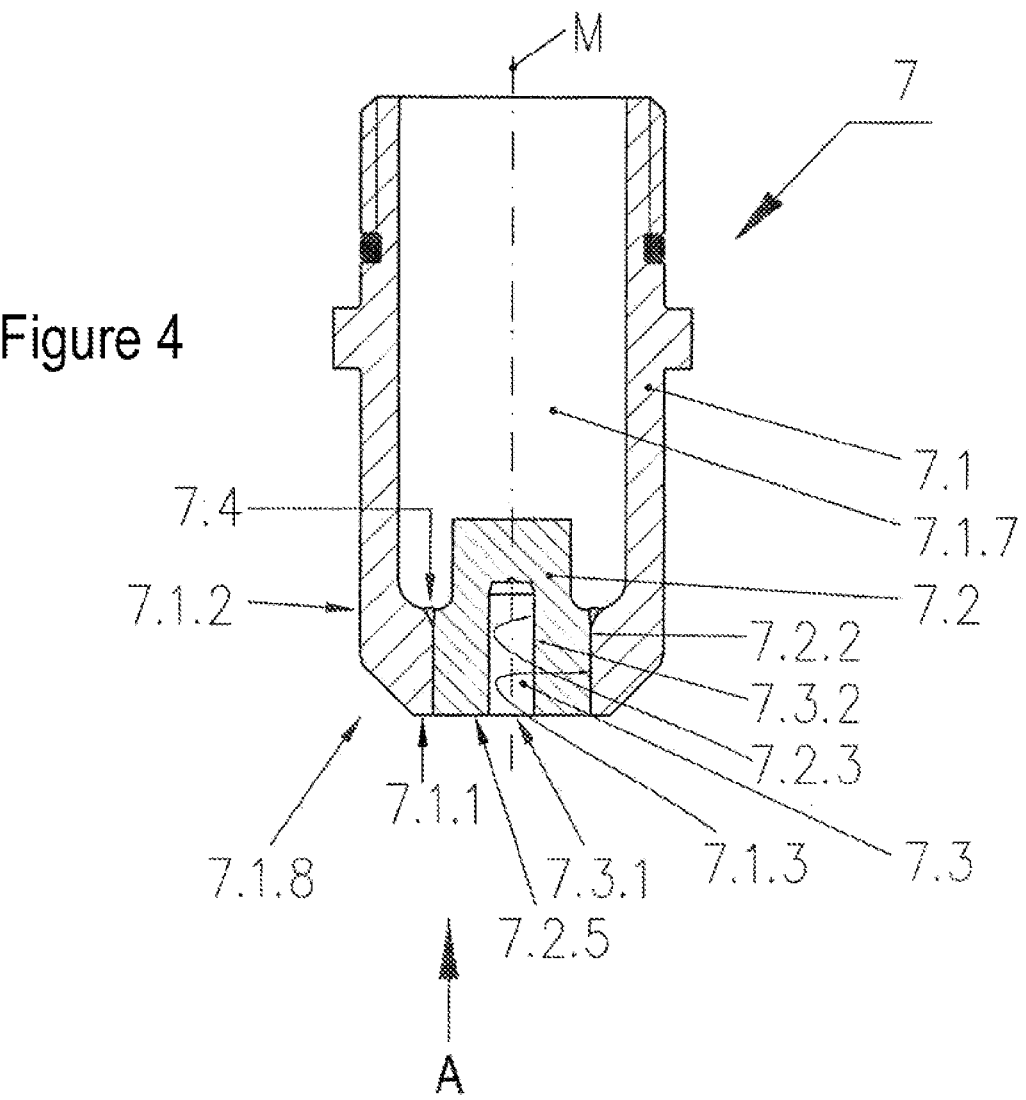
Figure 4
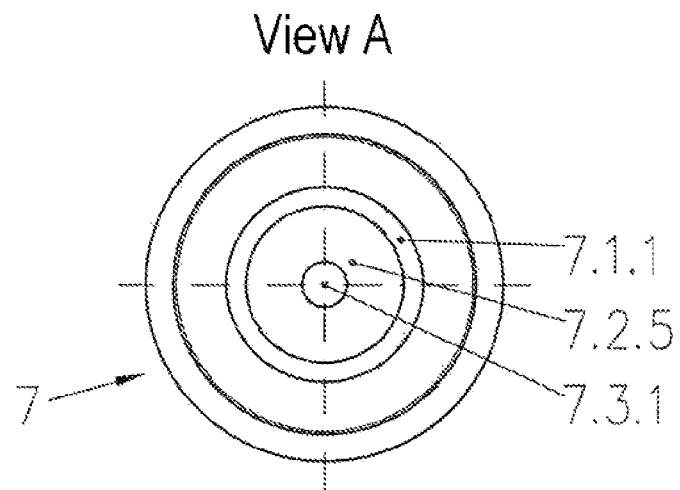
Figure 4.1
View A

Figure 4.2
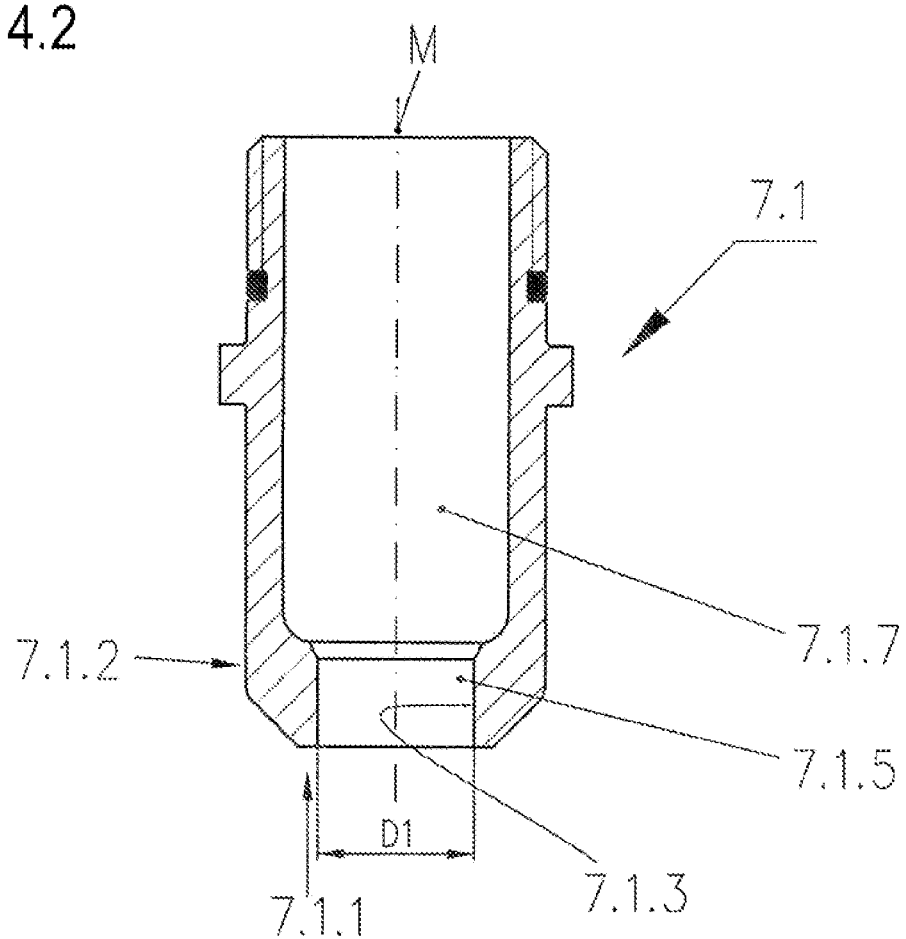

Figure 4.3
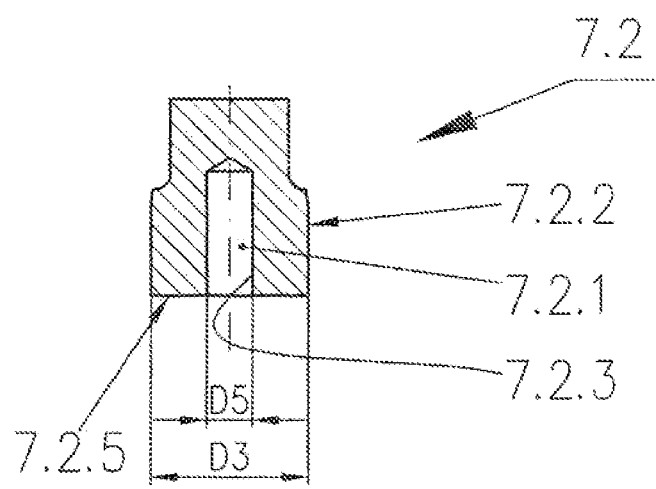

Figure 5.1

View A

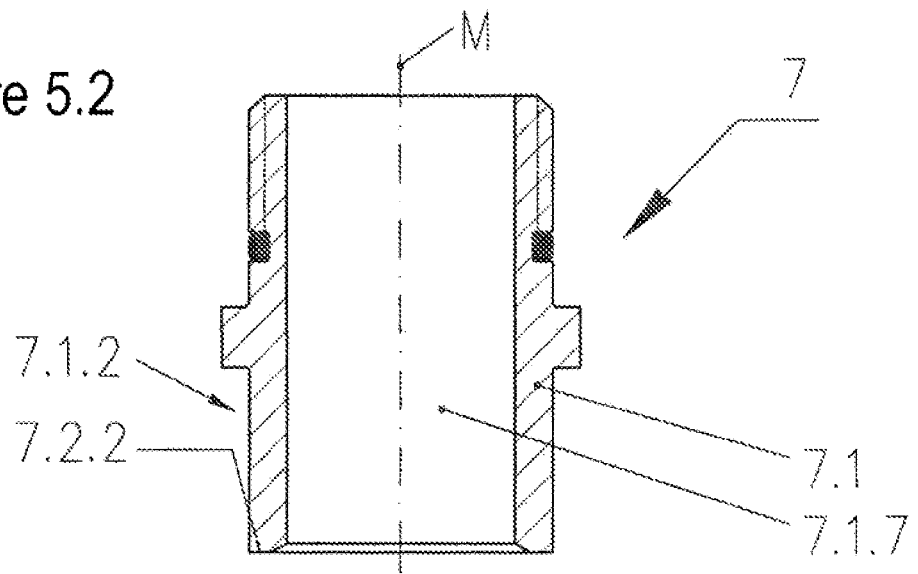
Figure 5.2

Figure 5.3
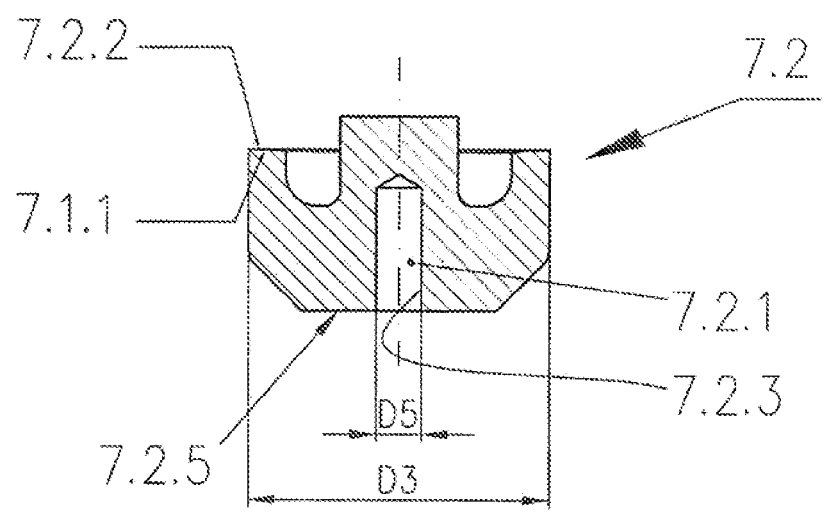

Figure 6.1
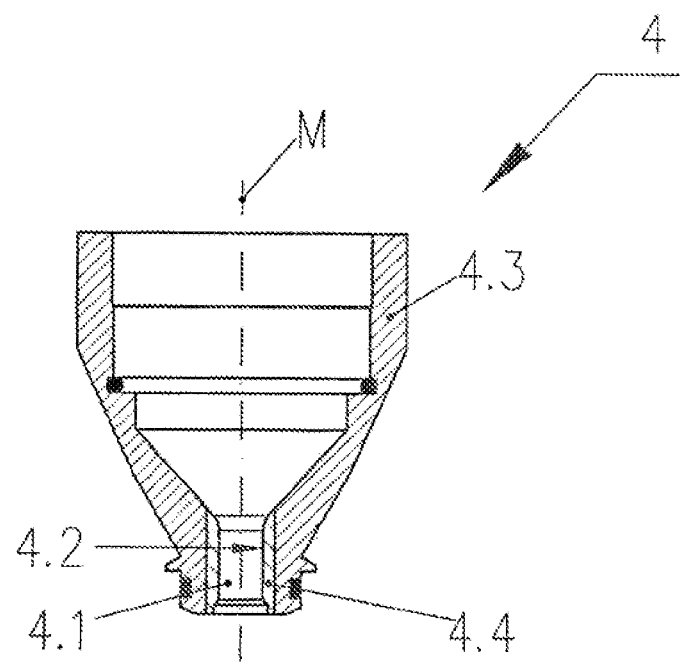

Figure 7.1
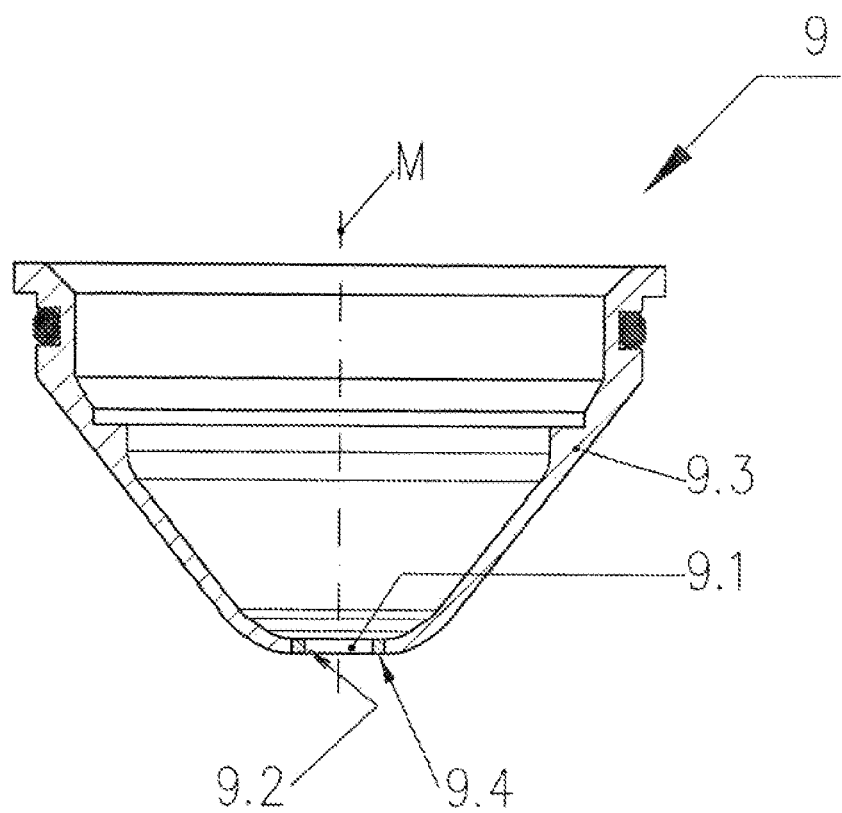

WEAR PART FOR AN ARC TORCH AND PLASMA TORCH, ARC TORCH AND PLASMA TORCH COMPRISING SAME, METHOD FOR PLASMA CUTTING AND METHOD FOR PRODUCING AN ELECTRODE FOR AN ARC TORCH AND PLASMA TORCH

BACKGROUND

The present invention relates to a wearing part for an arc torch, plasma torch or plasma cutting torch, to an arc torch, plasma torch and plasma cutting torch comprising same, to plasma cutting methods, and to a method for producing an electrode for an arc torch, plasma torch or plasma cutting torch.

Arc torches and plasma torches are usually used for the thermal machining of materials of a wide variety of types, such as metallic and non-metallic materials, e.g. for cutting, welding, inscribing or quite generally for heating.

A TIG torch can be an arc torch, for example. However, it does not have a nozzle like a plasma torch does. Nevertheless, the electrodes of an arc torch and of a plasma torch may have identical configurations.

Plasma torches usually consist essentially of a torch body, an electrode, a nozzle and a mount therefor. Modern plasma torches additionally have a nozzle protective cap fitted over the nozzle. Often, a nozzle is fixed by means of a nozzle cap.

The components that become worn during operation of the plasma torch on account of the high thermal loading caused by the arc are, depending on the type of plasma torch, in particular the electrode, the nozzle, the nozzle cap, the nozzle protective cap, the nozzle protective cap mount and the plasma-gas-conducting and secondary-gas-conducting parts. These components can be easily exchanged by an operator and are thus referred to as wearing parts.

The plasma torches are connected via lines to a power source and a gas supply which supply the plasma torch. Furthermore, the plasma torch can be connected to a cooling device for a cooling medium, such as a cooling liquid for example.

High thermal loads occur especially in plasma cutting torches. These are caused by the great constriction of the plasma jet by the nozzle bore. Here, small bores are used in order that high current densities of 50 to 150 A/mm$^2$ in the nozzle bore, high energy densities of about 2×10$^6$ W/cm$^2$ and high temperatures of up to 30 000 K are generated. Furthermore, relatively high gas pressures, generally of up to 12 bar, are used in the plasma cutting torch. The combination of high temperature and great kinetic energy of the plasma gas flowing through the nozzle bore result in the workpiece melting and the molten material being driven out. A cutting kerf is produced and the workpiece is separated. In plasma cutting, use is often also made of oxidizing gases in order to cut unalloyed or low-alloy steels, and use is made of non-oxidizing gases in order to cut high-alloy steels or nonferrous metals.

A plasma gas flows between the electrode and the nozzle. The plasma gas is conducted by a gas-conducting part (plasma-gas-conducting part). This makes it possible to targetedly direct the plasma gas. Often, as a result of a radial and/or axial offset of the openings in the plasma-gas-conducting part, it is set in rotation about the electrode. The plasma-gas-conducting part consists of electrically insulating material, since the electrode and the nozzle have to be electrically insulated from one another. This is necessary since the electrode and the nozzle have different electric potentials during the operation of the plasma cutting torch. In order to operate the plasma cutting torch, an arc that ionizes the plasma gas is generated between the electrode and the nozzle and/or the workpiece. In order to ignite the arc, a high voltage can be applied between the electrode and the nozzle, this ensuring preionization of the section between the electrode and the nozzle and thus the formation of an arc. The arc burning between the electrode and the nozzle is also referred to as pilot arc.

The pilot arc exits through the nozzle bore and strikes the workpiece and ionizes the section as far as the workpiece. As a result, the arc can be formed between the electrode and the workpiece. This arc is also referred to as main arc. During the main arc, the pilot arc can be turned off. However, it can also continue to be run. During plasma cutting, it is often turned off in order not to subject the nozzle to additional load.

In particular the electrode and the nozzle are subject to high thermal load and need to be cooled. At the same time, they also have to conduct the electric current required for forming the arc. Therefore, materials with good thermal conductivity and good electrical conductivity are used for this purpose, usually metals, for example copper, silver, aluminum, tin, zinc, iron or alloys containing at least one of these metals.

The electrode often consists of an electrode holder and an emission insert, which is produced from a material that has a high melting point (>2000° C.) and a lower electron work function than the electrode holder. When use is made of non-oxidizing plasma gases, for example argon, hydrogen, nitrogen, helium and mixtures thereof, tungsten is used as material for the emission insert, and when use is made of oxidizing gases, for example oxygen, air and mixtures thereof, a nitrogen/oxygen mixture and mixtures with other gases, hafnium or zirconium are used as materials for the emission insert. The high-temperature material can be fitted in an electrode holder that consists of a material with good thermal conductivity and good electrical conductivity, for example pressed in with a form-fit and/or force-fit.

The electrode and the nozzle can be cooled by gas, for example the plasma gas or a secondary gas that flows along the outer side of the nozzle. However, cooling by means of a liquid, for example water, is more effective. In this case, the electrode and/or the nozzle are often cooled directly by means of the liquid, i.e. the liquid is in direct contact with the electrode and/or the nozzle. In order to guide the cooling liquid around the nozzle, there is a nozzle cap around the nozzle, the inner face of said nozzle gap forming, with the outer face of the nozzle, a coolant space in which the coolant flows.

In modern plasma cutting torches, a nozzle protective cap is additionally located outside the nozzle and/or the nozzle cap. The inner face of the nozzle protective cap and the outer face of the nozzle or of the nozzle cap form a space through which a secondary or protective gas flows. The secondary or protective gas exits the bore in the nozzle protective cap and envelops the plasma jet and ensures a defined atmosphere around the latter. In addition, the secondary gas protects the nozzle and the nozzle protective cap from arcs that can form between the latter and the workpiece. These are referred to as double arcs and can result in damage to the nozzle. In particular when the workpiece is being pierced, the nozzle and the nozzle protective cap are subjected to high loads by hot material splashing up. The secondary gas, the volumetric flow of which during piercing can be higher than the value during cutting, keeps the material that splashes up away from the nozzle and the nozzle protective cap and thus protects them from damage.

The nozzle protective cap is likewise subject to high thermal load and needs to be cooled. Therefore, for this purpose, use is made of materials with good thermal conductivity and good electrical conductivity, usually metals, for example copper, silver, aluminum, tin, zinc, iron or alloys containing at least one of these metals.

The electrode and the nozzle can also be indirectly cooled. In this case, they are in touching contact with a component that consists of a material with good thermal conductivity and good electrical conductivity, usually a metal, for example copper, silver, aluminium, tin, zinc, iron or alloys containing at least one of these metals. This component is in turn cooled directly, i.e. it is in direct contact with the usually flowing coolant. These components can be used at the same time as a mount or receptacle for the electrode, the nozzle, the nozzle cap or the nozzle protective cap, and dissipate the heat and feed the current.

It is also possible for only the electrode or only the nozzle to be cooled by means of liquid.

The nozzle protective cap is usually cooled only by the secondary gas. Arrangements are also known in which the secondary-gas cap is cooled directly or indirectly by a cooling liquid.

In the case of plasma torches and in particular in the case of plasma cutting torches, the wearing parts are subject to high loading on account of the high energy density and the high temperatures. This applies in particular to the electrode, the nozzle and the nozzle protective cap.

The solutions known to date for the electrode, in which the emission insert of high-melting material, such as e.g. tungsten, hafnium, is inserted into a material with good thermal conductivity, such as e.g. copper or silver, often achieve inadequate results. Especially in the case of large electric currents, for example of greater than 300 A, and when using oxygen-containing gases or gas mixtures as the plasma gas, the result is often service lives that are too short. Additionally, there are often large fluctuations in the service life. The emission insert wears during operation, that is to say when the arc or plasma jet is burning. Gradually, it burns back. If it is burnt back by more than 1 mm, when copper is used as the material for the electrode holder sudden failure of the entire electrode often occurs. The arc or plasma jet is then transferred from the emission insert to the holder and destroys it. This also gives rise to the destruction of the nozzle. It is even possible for the entire torch to be destroyed.

By using silver as the material for the electrode holder, the electrode can often burn back to 1.5 mm before failure occurs.

Since this failure also occurs suddenly, in the cases described the cutting process suddenly ends. The material to be cut is then often unusable.

SUMMARY

It is the aim of the invention to improve the service life of wearing parts, such as e.g. electrodes, nozzles and nozzle protective caps, for an arc torch, a plasma torch or a plasma cutting torch.

The present invention provides a wearing part as claimed, an arc torch as claimed, a plasma torch or plasma cutting torch as claimed and a plasma cutting method as claimed, a plasma cutting method as claimed, and a method for producing an electrode for an arc torch or a plasma torch as claimed.

According to a specific embodiment of the wearing part, the proportion of the silver is at least 60%, advantageously at least 80%, more preferably at least 92%, most preferably 97% of the volume or the mass of the wearing part or of the part or of the region.

According to a further specific embodiment, the proportion of the zirconium and/or of the hafnium is at least 0.05%, preferably at least 0.5%, most preferably at least 1% of the volume or of the mass of the wearing part or of the part or of the region.

According to a further specific embodiment, the proportion of the zirconium and/or of the hafnium is at most 5%, preferably at most 2% of the volume or of the mass of the wearing part or of the part or of the region.

Favorably, the remaining proportion up to 100% of the volume or of the mass of the wearing part or of the part or of the region is formed from copper up to at least 60%.

According to a specific embodiment, the wearing part is an electrode for an arc torch.

In particular, provision may be made here that the electrode has a front end and a rear end, extends along a longitudinal axis M and comprises at least an emission insert at the front end and an electrode holder and optionally a holding element for the emission insert.

In particular, provision may be made here that at least a sub-portion of an inner face of the electrode holder or an inner face of the holding element that is in touching contact with the emission insert consists of said alloy.

Furthermore, provision may be made here that at least a sub-portion of a front face that directly adjoins the front face of the emission insert comprises said alloy.

Expediently, at least a sub-portion of a front face that directly adjoins the front face of the emission insert comprises said alloy.

In particular, provision may be made here that said sub-portion of the front face extends at least 0.5 mm, more preferably at least 1 mm, radially outward.

Expediently, the emission insert consists of hafnium or zirconium or tungsten at least up to 90% of the volume or of the mass.

Provision may furthermore be made that the wearing part is a nozzle having at least one nozzle opening.

In particular, provision may be made here that at least a sub-portion of an inner face of the nozzle opening comprises said alloy.

In particular, provision may be made here that the alloy extends at least 0.5 mm, preferably at least 1 mm, radially outward at least from the sub-portion of the inner face of the nozzle opening.

According to a further specific embodiment of the present invention, provision may be made that the wearing part is a nozzle protective cap having at least one nozzle protective cap opening.

In particular, provision may be made here that at least a sub-portion of an inner face of the nozzle protective cap opening comprises said alloy.

Furthermore, provision may be made here that the alloy extends at least 0.5 mm, preferably at least 1 mm, radially outward from the sub-portion of the inner face of the nozzle protective cap opening.

In the plasma cutting method as claimed, provision may be made that the electrode and/or the nozzle and/or the nozzle protective cap is/are cooled by means of a liquid medium.

Lastly, in the plasma cutting method as claimed, provision may be made that the limit value for the burn-back is at least 2.0 mm, preferably at least 2.3 mm. The invention lengthens the service life of the wearing parts, in particular of the electrode. The emission insert can burn back further. Up to 2.5 mm was achieved in experiments. It was moreover established that beyond this burn-back depth an ignition of the pilot arc is often no longer possible and thus the destruction of the cathode during the cutting can be prevented.

In particular, the service life of an electrode, in particular in the event of use of oxygen-containing plasma gases, is lengthened.

BRIEF DESCRIPTION OF DRAWINGS

Further features and advantages of the invention will emerge from the appended claims and from the following description of specific exemplary embodiments with reference to the drawings, in which:

FIG. 2: shows a sectional view of an electrode of the plasma torch of FIG. 1;

FIG. 2.1: shows a view of the electrode of FIG. 2 from the front;

FIG. 2.2: shows a sectional view of an electrode holder of the plasma torch of FIG. 1;

FIG. 2.3: shows a further sectional view of the electrode of the plasma torch of FIG. 1;

FIG. 2.4: shows a sectional view of an emission insert of the electrode of FIG. 2;

FIG. 3: shows a sectional view of an electrode according to a further specific embodiment of the present invention;

FIG. 3.1: shows a view of the electrode of FIG. 3 from the front;

FIG. 3.2: shows a sectional view of an electrode holder of the electrode of FIG. 3;

FIG. 3.3: shows a view of a holding element of the electrode of FIG. 3 from the front;

FIG. 3.4: shows a sectional view of the holding element of FIG. 3.3;

FIG. 4: shows a sectional view of an electrode according to a further specific embodiment of the present invention;

FIG. 4.1: shows a view of the electrode of FIG. 4 from the front;

FIG. 4.2: shows a sectional view of an electrode holder of the electrode of FIG. 4;

FIG. 4.3: shows a sectional view of a holding element of the electrode of FIG. 4;

FIG. 5.1: shows a view of the electrode of FIG. 5 from the front;

FIG. 5.2: shows a sectional view of an electrode holder of the electrode of FIG. 5;

FIG. 5.3: shows a sectional view of a holding element of the electrode of FIG. 5;

FIG. 6.1: shows a further sectional view of the nozzle of FIG. 6;

FIG. 7.1: shows a sectional view of the nozzle protective cap of FIG. 7.

DETAILED DESCRIPTION

Figure 1:
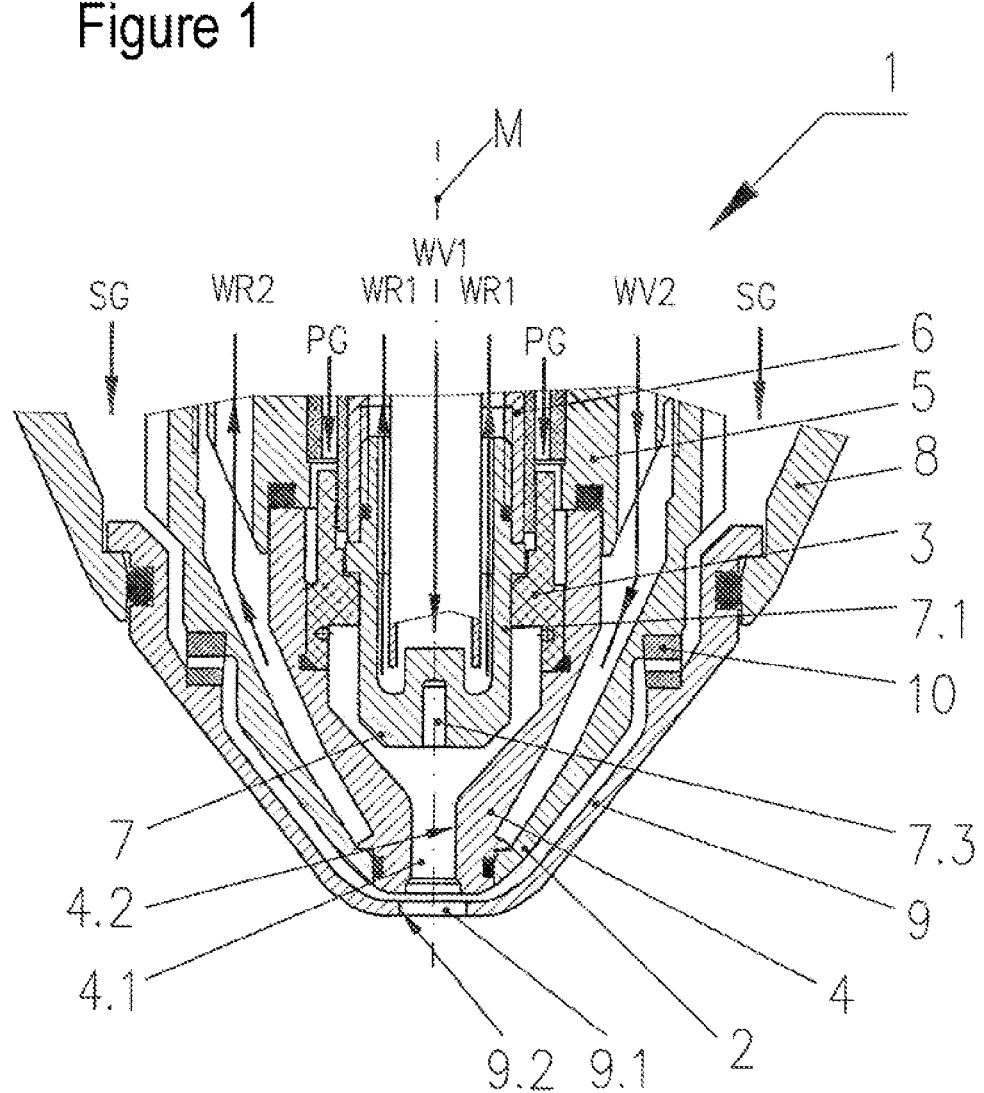
FIG. 1: shows a sectional view of a plasma torch according to a specific embodiment of the present invention.

FIG. 1 shows a sectional view of a plasma cutting torch 1 (however, it could also be an arc torch or a plasma torch) according to a specific embodiment of the present invention, having a nozzle cap 2, a plasma-gas-conducting unit 3, a nozzle 4 according to a specific embodiment of the present invention having a nozzle opening 4.1, a nozzle receptacle 5, an electrode receptacle 6 and an electrode 7 according to a specific embodiment of the present invention. The electrode 7 comprises an electrode holder 7.1 and an emission insert 7.3 with a length L1 of for example 3 mm (see FIG. 2.4). The plasma cutting torch 1 further comprises a nozzle protective cap receptacle 8, to which is fastened a nozzle protective cap 9 according to a specific embodiment of the present invention having a nozzle protective cap opening 9.1. The plasma cutting torch 1 also includes a secondary-gas-conducting unit 10. Secondary gas SG is fed through the secondary-gas-conducting unit 10. Additionally present on the plasma cutting torch 1 are a feed line for plasma gas PG, coolant return lines WR1 and WR2, and coolant feed lines WV1 and WV2. During operation, an arc or plasma jet burns between the emission insert 7.3 of the electrode 7 when cutting is taking place, flows through the nozzle opening 4.1 and the nozzle protective cap opening 9.1, and is constricted as a result, before it strikes a workpiece (not illustrated). The inner face of the nozzle opening 4.1 is denoted by the reference numeral 4.2 and that of the nozzle protective cap opening 9.1 is denoted by the reference numeral 9.2.

FIGS. 2 and 2.1 show the electrode 7 of FIG. 1, FIG. 2 being a sectional view through the electrode 7 and FIG. 2.1 being the view A of the front end of the electrode 7. The electrode 7 has a front end 7.1.8 and a rear end 7.1.9. The electrode 7 comprises the electrode holder 7.1, which is shown in FIG. 2.2, and the emission insert 7.3. The emission insert 7.3 is pressed in a bore 7.1.5 with a diameter D1 of e.g. 1.8 mm (−0.05) in the electrode holder 7.1. The bore 7.1.5 has an inner face 7.1.3, which is in touching contact with the outer lateral face 7.3.2 of the emission insert 7.3.

By way of example, the electrode holder 7.1 consists of an alloy of silver, copper and zirconium. The proportions of the mass are apportioned for example as follows: silver 97%, zirconium 2%, copper 1%. Here, the alloy has been used for the entire electrode holder 7.1 by way of example. It is also possible that the alloy is present only in a part or a region of the electrode holder 7.1. This is then preferably the case at least on the inner face 7.1.3 of the electrode holder 7.1. In that case, this region extends preferably at least 0.5 mm from the inner face radially outward. It is more preferable if the region extends at least 1 mm radially outward. This may be implemented e.g. in that the zirconium proportion and/or the silver proportion radially outwardly decrease(s) and the copper proportion increases.

FIG. 2.3, which shows a sectional view of the electrode 7, also shows a burn-back L2. The burn-back is defined as the difference between the face 7.3.1 of the emission insert 7.3 in the new state and the deepest point of the face burned back during operation. In the present example, L2=2 mm, for example.

In this example, the mass of the emission insert 7.3 preferably consists of hafnium to at least 97%.

FIG. 3 shows an electrode 7 according to a further specific embodiment of the invention, FIG. 3 being a sectional view through the electrode 7 and FIG. 3.1 being the view A of the front end 7.1.8 of the electrode 7. The electrode 7 has a front end 7.1.8 and a rear end 7.1.9. The electrode 7 comprises an electrode holder 7.1, which is shown in FIG. 3.1, a holding element 7.2, which is shown in FIGS. 3.3 and 3.4, and an emission insert 7.3. The emission insert 7.3 is pressed in a bore 7.2.1 with a diameter D5 in the holding element 7.2. The bore 7.2.1 has an inner face 7.2.3, which is in touching contact with the outer lateral face 7.3.2 of the emission insert 7.3.

The holding element 7.2 is pressed in the bore 7.1.5 in the electrode holder 7.1. The bore has an inner face 7.1.3, which is in touching contact with the outer lateral face 7.2.2 of the holding element.

By way of example, the holding element 7.2 consists here of an alloy of silver, copper and zirconium. The proportions of the mass are apportioned for example as follows: silver 97%, zirconium 2%, copper 1%. Here, the alloy is used for the entire holding element 7.2 by way of example.

The holding element 7.2 has a diameter D3 of for example 4 mm, the emission insert 7.3 has a diameter D7 (see FIG. 2.4) of for example 1.8 mm. This results in a wall thickness of the holding element of 1.1 mm and thus also a front circular ring face 7.2.5, which extends 1.1 mm radially outward.

It is also possible that the alloy is present only in a part or a region of the holding element 7.2. This is then preferably the case at least on the inner face 7.2.3 of the holding element 7.2. In that case, this region extends preferably at least 0.5 mm from the inner face 7.2.3 radially outward. It is more preferable if the region extends at least 1 mm radially outward. This may be implemented e.g. in that the zirconium proportion and/or the silver proportion radially outwardly decrease(s) and the copper proportion increases.

The electrode holder 7.1 consists at least of a material with good electrical conductivity, in this example consists of copper up to 90% of its mass.

In this example, the mass of the emission insert preferably consists of hafnium at least up to 97%.

FIG. 4 shows an electrode 7 according to a further specific embodiment of the invention, FIG. 4 being a sectional view through the electrode 7 and FIG. 4.1 being the view A of the front end 7.1.8 of the electrode 7. The electrode 7 has a front end 7.1.8 and a rear end 7.1.9. The electrode 7 comprises an electrode holder 7.1, which is shown in FIG. 4.2, a holding element 7.2, which is shown in FIG. 4.3, and an emission insert 7.3. The emission insert 7.3 is introduced in a bore 7.2.1 with a diameter D5 in the holding element 7.2.

The bore 7.2.1 in the holding element 7.2 has an inner face 7.2.3, which is in touching contact with the outer lateral face 7.3.2 of the emission insert 7.3.

The holding element 7.2 is pressed in a bore 7.1.5 in the electrode holder 7.1. The bore 7.1.5 has an inner face 7.1.3, which is in touching contact with the outer lateral face 7.2.2 of the holding element 7.2. In this respect, the holding element 7.2 may be connected to the electrode holder 7.1 by a force fit, form fit, or else by a thermal joining method, such as soldering, welding, in particular laser soldering, laser welding, arc soldering, arc welding, vacuum soldering, vacuum laser welding or electron-beam welding. It is particularly advantageous if the welding or soldering is performed from the rear end 7.1.9 and a seam (weld seam, soldered seam) 7.4 is located in a cavity 7.1.7 extending as far as the rear end. Also advantageous as a joining method is diffusion welding; pressure and temperature are applied here.

When the holding element 7.2 is thermally joined, e.g. soldered or welded, to the electrode holder 7.1 from the direction of the cavity 7.1.7, it has the following advantages over thermal joining from the front, for example:
    no seam visible from the front and
    no post-processing is necessary.

By way of example, the holding element 7.2 consists here of an alloy of silver, copper and zirconium. The proportions of the mass are apportioned for example as follows: silver 97%, zirconium 2%, copper 1%. Here, the alloy has been used for the entire holding element 7.2 by way of example.

The holding element 7.2 has a diameter D3 of for example 6 mm, the emission insert 7.3 has a diameter D7 of for example 1.8 mm. This results in a wall thickness of the holding element 7.2 of 2.1 mm and thus also a front circular ring face 7.2.5, which extends 2.1 mm radially outward.

It is also possible that the alloy is present only in a part or a region of the holding element 7.2. This is then preferably the case at least on the inner face 7.2.3 of the holding element 7.2. In that case, this region extends preferably at least 0.5 mm from the inner face radially outward. It is more preferable if the region extends at least 1 mm radially outward. This may be implemented for example in that the zirconium proportion and/or the silver proportion radially outwardly decrease(s) and the copper proportion increases.

The electrode holder 7.1 consists at least of a material with good electrical conductivity, in this example of copper up to 90% of its mass.

In this example, the mass of the emission insert preferably consists of hafnium at least up to 97%.

Figure 5:
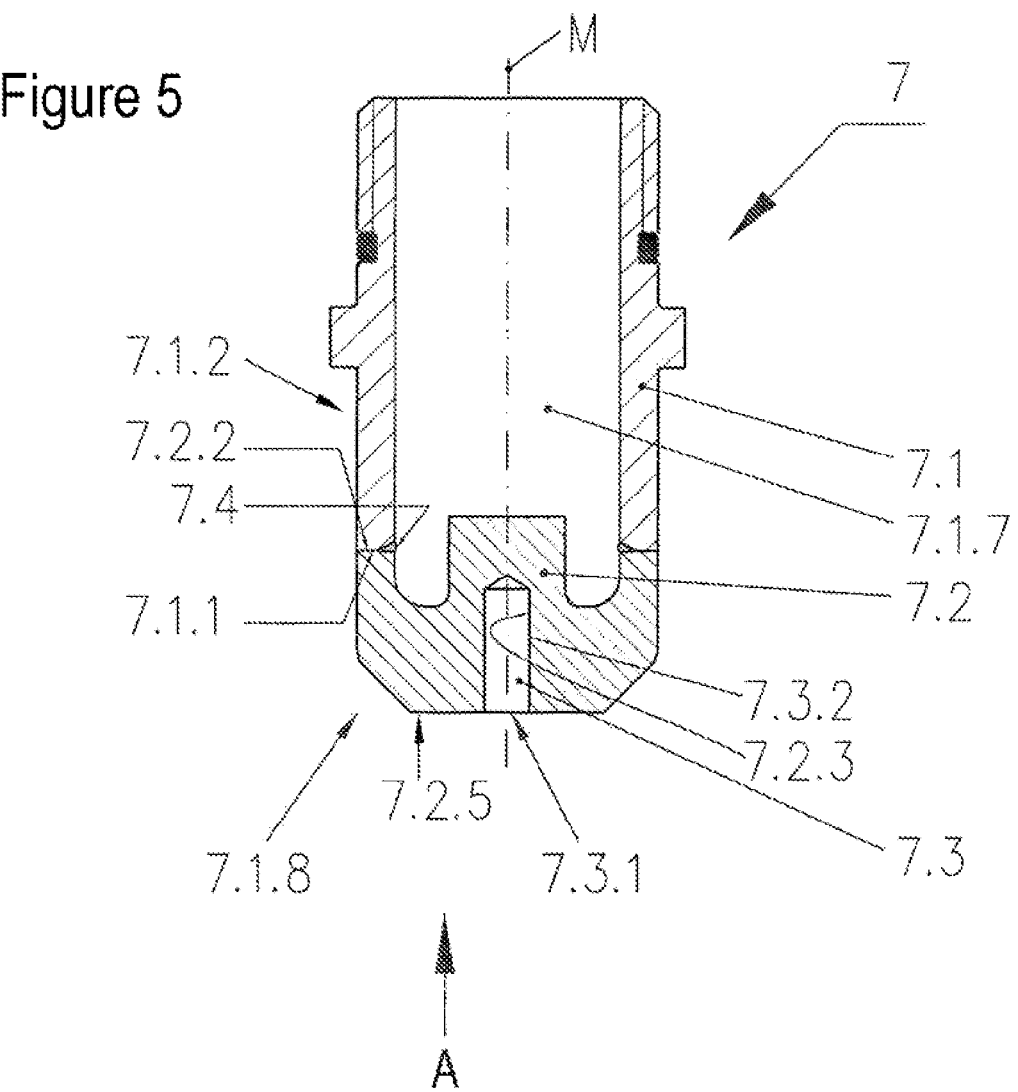
FIG. 5: shows a sectional view of an electrode according to a further specific embodiment of the present invention.
Figure 5:
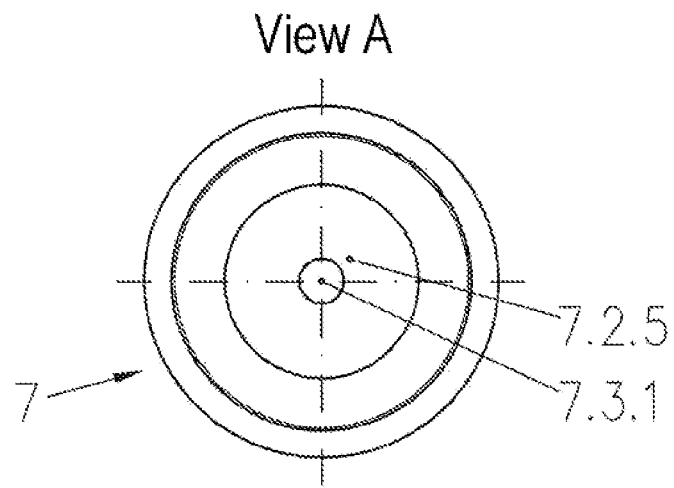

FIG. 5 shows an electrode 7 according to a further specific embodiment, FIG. 5 being a sectional view through the electrode 7 and FIG. 5.1 being the view A of the front end 7.1.8 of the electrode. The electrode 7 has a front end 7.1.8 and a rear end 7.1.9. The electrode 7 comprises an electrode holder 7.1, which is shown in FIG. 5.2, a holding element 7.2, which is shown in FIG. 5.3, and an emission insert 7.3. The emission insert 7.3 is introduced in a bore 7.2.1 with a diameter D5 in the holding element 7.2.

The bore in the holding element 7.2 has an inner face 7.2.3, which is in touching contact with the outer lateral face 7.3.2 of the emission insert.

The holding element 7.2 is fitted on the cylindrical portion on the outer face 7.1.1 of the electrode holder 7.1. In this respect, the holding element 7.2 may be connected to the electrode holder 7.1 by a force fit, form fit, or else by a thermal joining method, such as soldering, welding, in particular laser soldering, laser welding, arc soldering, arc welding, vacuum soldering, vacuum laser welding or electron-beam welding. It is particularly advantageous if the welding or soldering is performed from the rear end 7.19 and a seam (weld seam, soldered seam) 7.4 is located in a cavity 7.1.7 extending as far as the rear end. Also advantageous as a joining method is diffusion welding. Pressure and temperature are applied here.

By way of example, the holding element 7.2 consists here of an alloy of silver, copper and zirconium. The proportions of the mass are apportioned for example as follows: silver 97%, zirconium 2%, copper 1%. Here, the alloy has been used for the entire holding element 7.2 by way of example.

The holding element 7.2 has a diameter D3 of for example 10 mm, the emission insert has a diameter D7 of for example 1.8 mm. This results in a wall thickness of the holding element 7.2 of 4.1 mm and thus also a front circular ring face 7.2.5, which extends 4.1 mm radially outward.

It is also possible that the alloy is present only in a part or a region of the holding element 7.2. This is then preferably the case at least on the inner face 7.2.3 of the holding element 7.2. In that case, this region extends preferably at least 0.5 mm from the inner face radially outward. It is more preferable if the region extends at least 1 mm radially outward. This may be implemented e.g. in that the zirconium proportion and/or the silver proportion radially outwardly decrease(s) and the copper proportion increases.

The electrode holder 7.1 consists at least of a material with good electrical conductivity, in this example of copper up to 90% of its mass.

In this example, the mass of the emission insert preferably consists of hafnium at least up to 97%.

Figure 6:
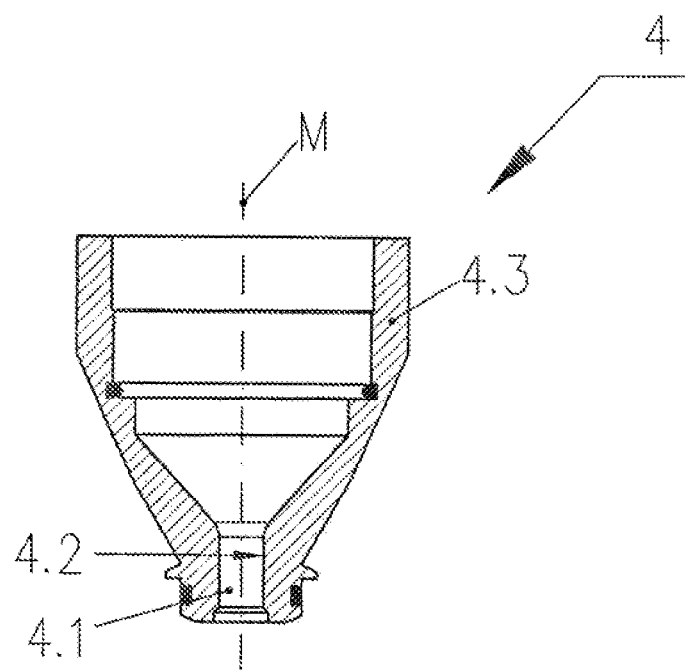
FIG. 6: shows a sectional view of a nozzle according to a specific embodiment of the present invention.

FIG. 6 shows a nozzle 4 according to a specific embodiment of the present invention, which is used by way of example in the plasma torch 1 of FIG. 1. This nozzle 4 may consist completely of an alloy of silver and zirconium, of silver and hafnium or of silver and zirconium and hafnium. However, it is essential that that region of the nozzle that can come into contact with the plasma jet or the arc consists of this material. This is the inner face 4.2 of the nozzle 4. This may be effected for example by fastening a nozzle insert 4.4 of said material in a nozzle mount 4.3. This is illustrated by way of example in FIG. 6.1.

In the present examples, in FIG. 6 the nozzle 4 and in FIG. 6.1 the nozzle cap insert 4.4 consist of an alloy of silver, copper and zirconium. The proportions of the mass are apportioned for example as follows: silver 97%, zirconium 2%, copper 1%. Here, the alloy has been used for the entire nozzle 4 by way of example.

In this context, the nozzle insert 4.4 may be connected to the nozzle holder 4.3 by a force fit, form fit, or else by a thermal joining method, such as soldering, welding, in particular laser soldering, laser welding, arc soldering, arc welding, vacuum soldering, vacuum laser welding or electron-beam welding. Also advantageous as a joining method is diffusion welding. Pressure and temperature are applied here.

Figure 7:
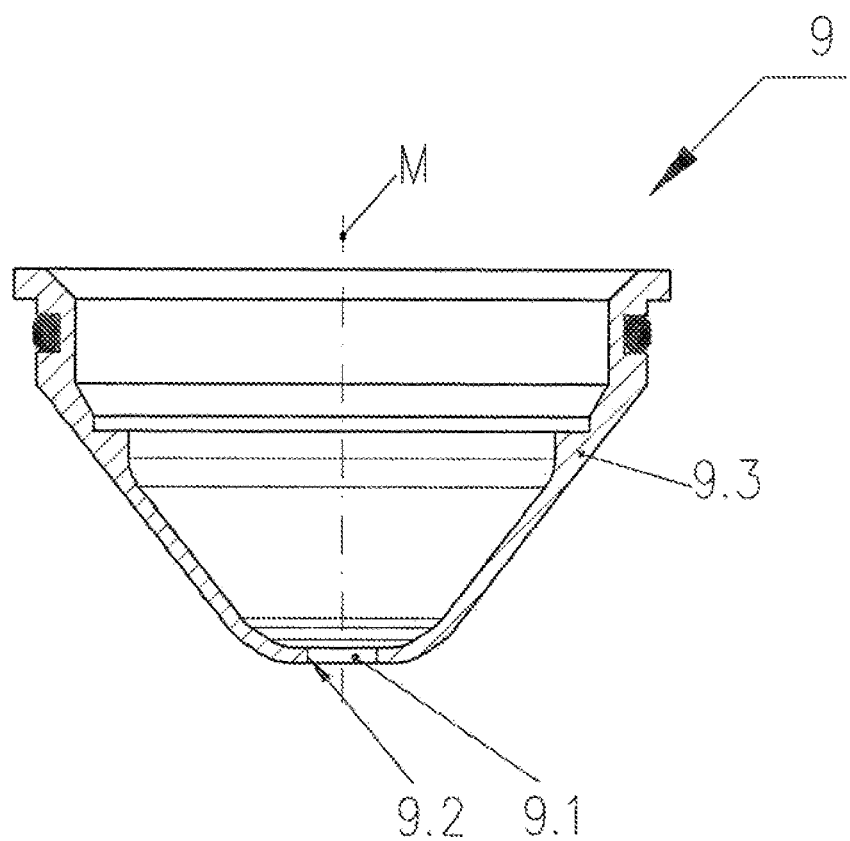
FIG. 7: shows a sectional view of a nozzle protective cap according to a specific embodiment of the present invention.

FIG. 7 shows the nozzle protective cap 9 according to FIG. 1. This nozzle protective cap 9 may consist completely of e.g. an alloy of silver and zirconium, of silver and hafnium or of silver and zirconium and hafnium. However, it is essential that that region of the nozzle that can come into contact with the plasma jet or the arc consists of this material. This is the inner face 9.2 of the nozzle protective cap 9. This may be effected for example by fastening a nozzle protective cap insert 9.4 of said material in a nozzle protective cap holder 9.3. This is illustrated by way of example in FIG. 7.1.

In the present examples, in FIG. 7 the nozzle protective cap 9 and in FIG. 7.1 the nozzle protective cap insert 7.1 consist of an alloy of silver, copper and zirconium. The proportions of the mass are apportioned for example as follows: silver 97%, zirconium 2%, copper 1%. Here, the alloy has been used for the entire nozzle protective cap 9 by way of example.

In this context, the nozzle protective cap insert 9.4 may be connected to the nozzle protective cap holder 9.3 by a force fit, form fit, or else by a thermal joining method, such as soldering, welding, in particular laser soldering, laser welding, arc soldering, arc welding, vacuum soldering, vacuum laser welding or electron-beam welding. Also advantageous as a joining method is diffusion welding. Pressure and temperature are applied here.

It is possible for the features of the invention that are disclosed in the above description, in the drawings and in the claims to be essential to the implementation of the invention in their various embodiments both individually and in the optional combinations.

LIST OF REFERENCE SIGNS

1 Arc torch, plasma torch, plasma cutting torch
2 Nozzle cap
3 Plasma-gas-conducting unit
4 Nozzle
4.1 Nozzle opening
4.2 Inner face of the nozzle opening
4.3 Nozzle holder
4.4 Nozzle insert
5 Nozzle receptacle
6 Electrode receptacle
7 Electrode
7.1 Electrode holder
7.1.1 Front face
7.1.2 Outer face
7.1.3 Inner face
7.1.5 Bore
7.1.7 Cavity
7.1.8 Front end
7.1.9 Rear end
7.2 Holding element
7.2.1 Bore
7.2.2 Outer lateral face
7.2.3 Inner face
7.2.5 Front circular ring face
7.3 Emission insert
7.3.1 Front face
7.3.2 Outer lateral face
7.4 Seam
8 Nozzle protective cap receptacle
9 Nozzle protective cap
9.1 Nozzle protective cap opening
9.2 Inner face of the nozzle protective cap opening
9.3 Nozzle protective cap holder
9.4 Nozzle protective cap insert
10 Secondary-gas-conducting unit
D1 Inner diameter
D3 Outer diameter
D5 Inner diameter
D7 Diameter
L1 Length
L2 Burn-back
M Central longitudinal axis
PG Plasma gas
SG Secondary gas
WR1 Coolant return line
WR2 Coolant return line
WV1 Coolant feed line
WV2 Coolant feed line

The invention claimed is:
1. A wearing part for an arc torch, plasma torch or plasma cutting torch, comprising:
at least a part or region of said wearing part comprises an alloy of one of silver and zirconium, silver and hafnium, and silver and zirconium and hafnium;
said wearing part is an electrode for an arc torch;
said electrode has a front end and a rear end extends along a longitudinal axis M, and comprises at least an emission insert at said front end and an electrode holder; and at least a sub-portion of an inner face of said electrode holder comprises said alloy.

2. The wearing part of claim 1 further comprising the proportion of silver is between 60% and 97% of the volume or of the mass of said at least a part or region of said wearing part.

3. The wearing part of claim 1 further comprising the proportion of zirconium or hafnium is at least 0.05% of the volume or of the mass of said at least a part or region of said wearing part.

4. The wearing part of claim 1 further comprising the proportion of zirconium or hafnium is at most 5% of the volume or of the mass of said at least a part or region of said wearing part.

5. The wearing part of claim 1 further comprising the remaining proportion up to 100% of the volume or of the mass of said wearing part is formed from copper up to at least 60%.

6. The wearing part of claim 1 further comprising said alloy extends at least 0.5 mm radially outward from said at least a sub-portion of said inner face said electrode holder.

7. The wearing part of claim 1 further comprising said at least a sub-portion of said front face that directly adjoins said front face of said emission insert comprises said alloy.

8. The wearing part of claim 7 further comprising said sub-portion of said front face extends at least 0.5 mm radially outward.

9. The wearing part of claim 1 further comprising said emission insert comprises at least up to 90% of the volume or of the mass of one of hafnium, zirconium, and tungsten.

10. A wearing part for an arc torch, plasma torch or plasma cutting torch, comprising:
at least a part or region of said wearing part comprises an alloy of one of silver and zirconium, silver and hafnium, and silver and zirconium and hafnium;
said wearing part is a nozzle having at least one nozzle opening; and
at least a sub-portion of an inner face of said nozzle opening comprises said alloy.

11. The wearing part of claim 10 further comprising said alloy extends at least 0.5 mm radially outward at least from said sub-portion of said inner face of said nozzle opening.

12. The wearing part of claim 10 further comprising the proportion of silver is between 60% and 97% of the volume or of the mass of said at least a part or region of said wearing part.

13. The wearing part of claim 10 further comprising the proportion of zirconium or hafnium is at least 0.05% of the volume or of the mass of said at least a part or region of said wearing part.

14. The wearing part of claim 10 further comprising the proportion of zirconium or hafnium is at most 5% of the volume or of the mass of said at least a part or region of said wearing part.

15. The wearing part of claim 10 further comprising the remaining proportion up to 100% of the volume or of the mass of said wearing part is formed from copper up to at least 60%.

16. A wearing part for an arc torch, plasma torch or plasma cutting torch, comprising:
at least a part or region of said wearing part comprises an alloy of one of silver and zirconium, silver and hafnium, and silver and zirconium and hafnium;
said wearing part is a nozzle protective cap having at least one nozzle protective cap opening; and
at least a sub-portion of an inner face of said nozzle protective cap opening comprises said alloy.

17. The wearing part of claim 16 further comprising said alloy extends at least 0.5 mm radially outward from said at least a sub-portion of said inner face of said nozzle protective cap opening.

18. The wearing part of claim 16 further comprising the proportion of silver is between 60% and 97% of the volume or of the mass of said at least a part or region of said wearing part.

19. The wearing part of claim 16 further comprising the proportion of zirconium or hafnium is at least 0.05% of the volume or of the mass of said at least a part or region of said wearing part.

20. The wearing part of claim 16 further comprising the proportion of zirconium or hafnium is at most 5% of the volume or of the mass of said at least a part or region of said wearing part.

21. The wearing part of claim 16 further comprising the remaining proportion up to 100% of the volume or of the mass of said wearing part is formed from copper up to at least 60%.

* * * * *